Nov. 24, 1970 E. A. ROCKWELL 3,543,298
DUAL HYDRAULIC BRAKE WITH IMPROVED BOOSTER MECHANISM
Filed Sept. 18, 1968 6 Sheets-Sheet 3

INVENTOR
EDWARD A. ROCKWELL by: Wolfe, Hubbard, Voit & Osann
ATTYS.

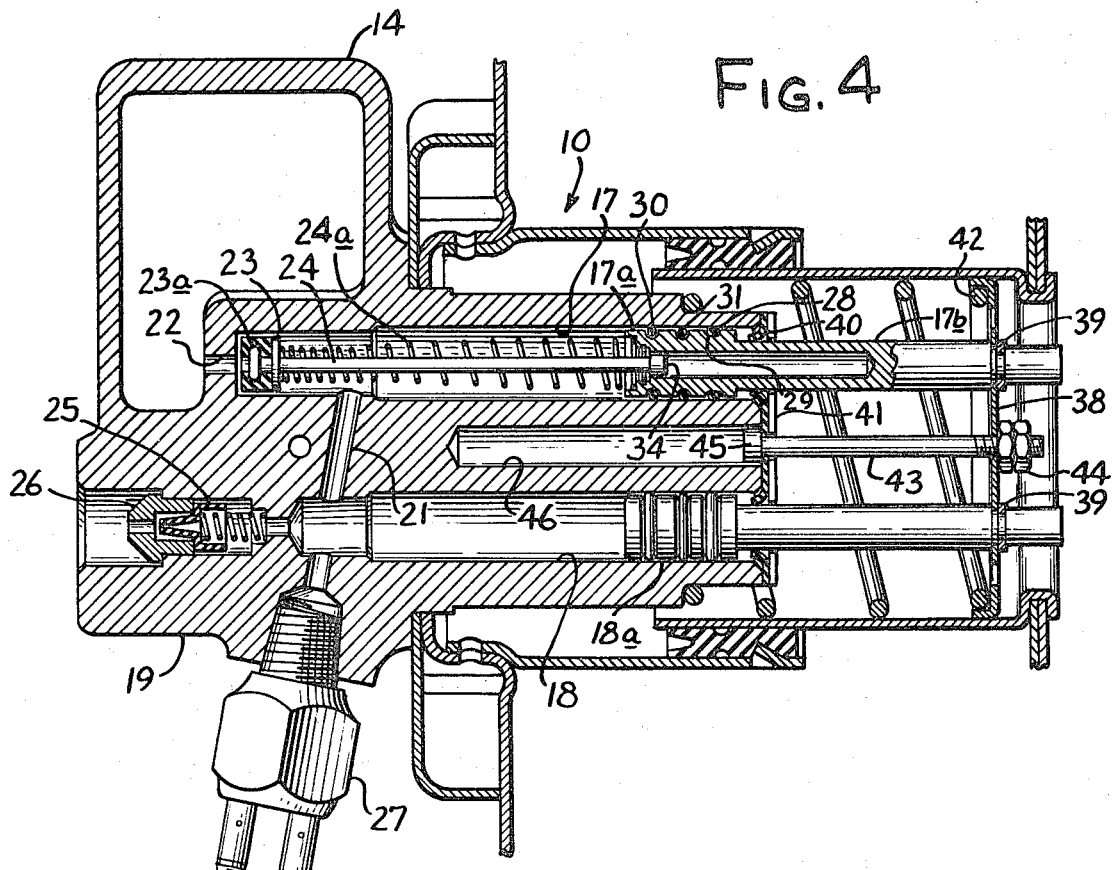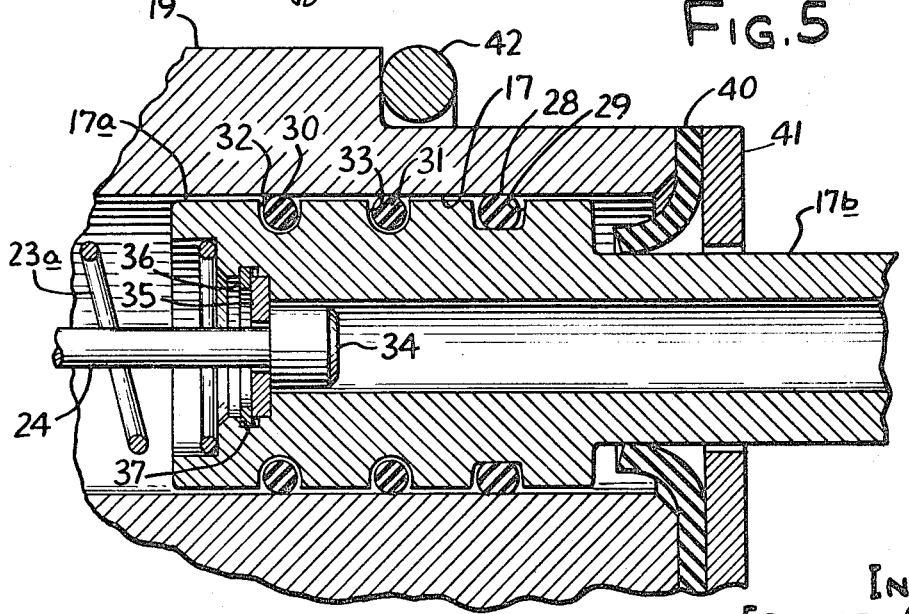

INVENTOR
EDWARD A. ROCKWELL by: Wolfe, Hubbard, Voit & Osann
ATTYS.

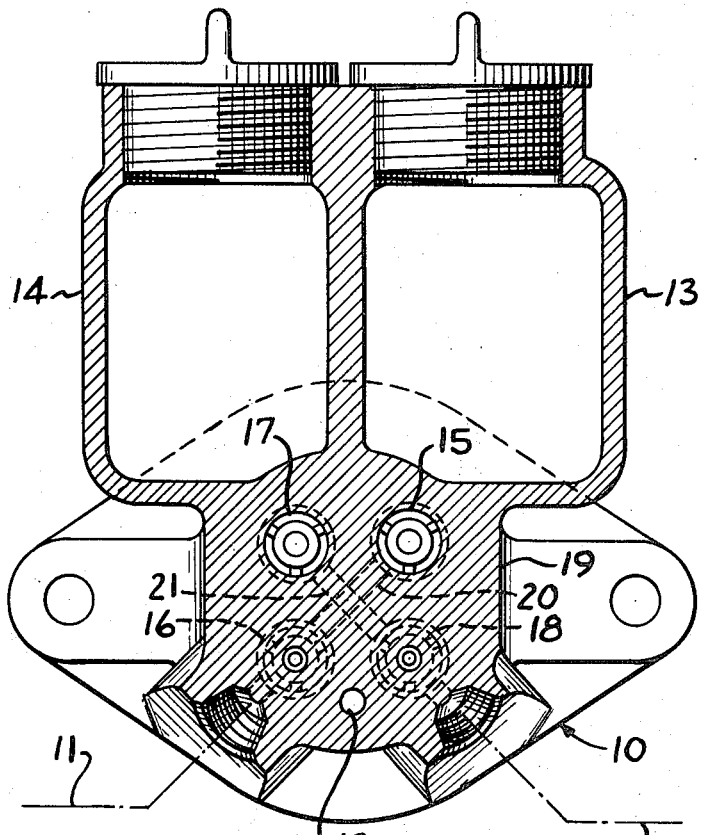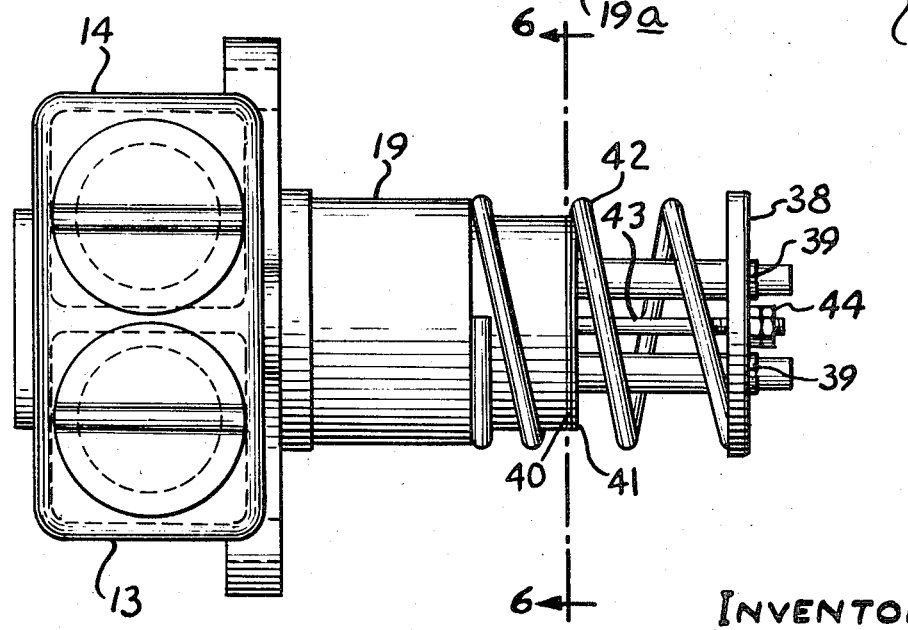

United States Patent Office 3,543,298
Patented Nov. 24, 1970

3,543,298
DUAL HYDRAULIC BRAKE WITH IMPROVED BOOSTER MECHANISM
Edward A. Rockwell, 167 Ashdale Place,
Los Angeles, Calif. 90049
Filed Sept. 18, 1968, Ser. No. 760,630
Int. Cl. F15b 7/00, 7/08, 9/00
U.S. Cl. 60—54.5                                       6 Claims

ABSTRACT OF THE DISCLOSURE

A power unit for a hydraulic brake system in which the power wall assembly includes a pair of opposed plates which form a fluid chamber therebetween, with a reaction mechanism mounted within the fluid chamber between the power wall plates to provide a compact assembly. The reaction mechanism includes a resilient bumper element mounted on the power wall at least partially unconfined. A plunger connected to manually operated actuating means is adapted to engage the resilient bumper element upon manual advance of the actuating means so that the resilient element is deformed into the free space adjacent the unconfined areas thereof. An annular diaphragm connects the outer periphery of the power wall to the casing, with the intermediate portion of the diaphragm overlapping the forward plate on the power chamber side of the wall; this overlapping portion of the diaphragm defines a plurality of relief ports which are normally closed by the forward plate during normal movement of the power wall, but the ports are opened by sudden advancing movement of the forward plate ahead of the diaphragm so as to provide supplemental fluid communication means between the chambers to relieve excessive pressure.

---

The present invention relates generally to improvements in dual hydraulic brakes and, more particularly, to a new dual hydraulic brake having an improved master cylinder assembly and power actuating mechanism therefor.

A further object of this invention is to provide a power brake actuating unit of the type described above in which relief means for relieving excessive pressure during panic stops are built into the power wall. A related object is to provide such a power wall structure which eliminates the need for any relief function in the valve between the vacuum chamber and the engine manifold.

It is still another object of the present invention to provide an improved power brake actuator of the foregoing type having an improved reaction mechanism. Thus, it is an object to provide a reaction mechanism which is compact and convenient to assemble, and which has improved operating characteristics.

It is a primary object of this invention to provide an improved dual hydraulic brake system having a power actuating unit which is extremely compact and yet also has improved performance features. In this connection, it is a particular object of the invention to provide such a brake actuating unit in which the multiple master cylinder assembly can be substantially completely buried in the casing around the power wall.

It is another object of the present invention to provide an improved actuating unit for a dual hydraulic brake system which includes an improved sealing arrangement for the multiple master cylinders. A particular object of this aspect of the invention is to provide a multiple master cylinder assembly in which the sealing means prevents high pressure fluid from being trapped between the co-operating walls of the cylinders and pistons.

Yet another object of the invention is to provide an improved power brake mechanism of the foregoing type in which the entire power wall assembly, as well as the associated actuating means and reaction mechanism, can be quickly assembled and fastened by a simple locking means.

Other objects and advantages of the present invention will become apparent from the following detailed description taken in connection with the accompanying drawings, wherein:

FIG. 4 is a section taken along line 4—4 in FIG. 2;

FIG. 5 is an enlarged fragmentary view of one of the master cylinder pistons shown in FIG. 4;

FIG. 8 is a vertical section taken along line 8—8 in FIG. 1; and

FIG. 9 is a top plan view of the structure shown in FIG. 7.

Figure 1:
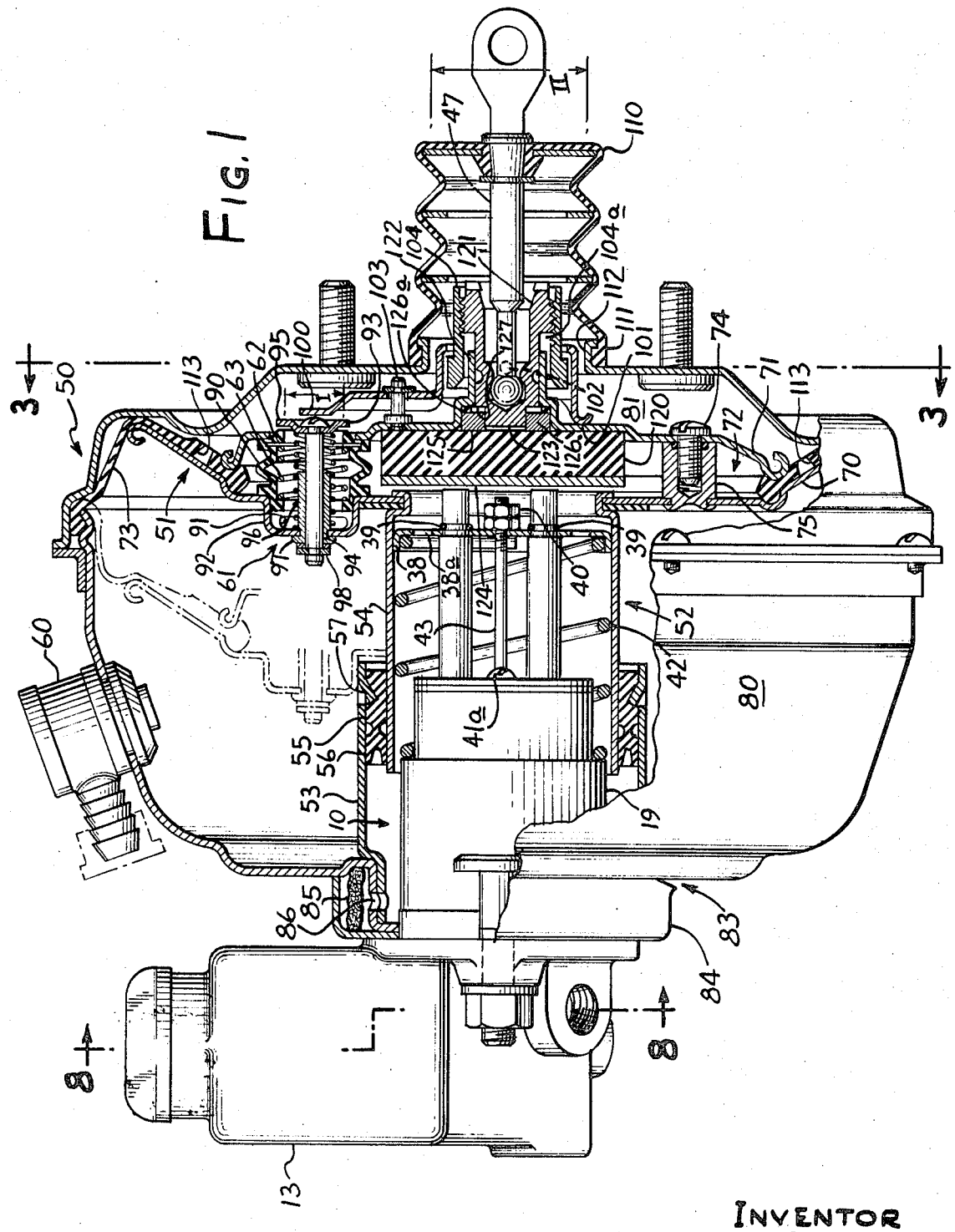
FIG. 1 is a side elevation of a power brake actuating mechanism for controlling hydraulically operated brakes, with portions broken away to show the internal structure.

While the invention will be described in connection with certain illustrated embodiments, it will be understood that it is not intended to limit the invention to these particular embodiments but, on the contrary, it is intended to cover such alternative embodiments, constructions and equivalents as may be included within the spirit and scope of the appended claims.

Turning now to the drawings, the invention will be described in connection with a dual hydraulic brake system having a master cylinder assembly 10 for controlling the hydraulic pressure in dual hydraulic lines 11, 12 which may be of the type described in my U.S. Pat. No. 3,326,-333, issued Feb. 2, 1967, and entitled "Disc Brake With Compensation, Anti-Skid Control, And Fail-Safe System." The dual hydraulic lines 11, 12 are connected via the master cylinder assembly 10 to a pair of independent fluid reservoir tanks 13, 14 mounted above the master cylinders, and the fluid in each line is supplied to a co-operating slave cylinder at each of the vehicle wheels to operate the wheel brakes. It will be appreciated that both of the hydraulic systems are fully operative at all times, thereby providing relatively small fluid requirements and cylinder sizes in both hydraulic systems. The two hydraulic systems associated with the dual reservoirs 13, 14 are completely independent of each other and, although the two systems are both operative together in parallel during normal usage, the vehicle brakes may be operated by one of the hydraulic systems in the event of a failure in the other system, in which case the unit pressure in the remaining system will double (if the cylinders for both systems are the same size), but will maintain the same hydraulic ratio as compared with the wheel cylinders. A dual hydraulic system of this type is described in more detail in the aforementioned U.S. Pat. No. 3,326,333, and reference is made thereto so that the details need not be repeated herein.

To provide the two independent hydraulic systems, the master cylinder assembly 10 comprises two pairs of master cylinders 15, 16 and 17, 18 formed in a single casting 19 so that the two master cylinders of each pair are symmetrically disposed on opposite sides of a central longitudinal axis. A master cylinder assembly of this type is described in more detail in my copending application Ser. No. 540,308, filed Apr. 15, 1968, and entitled "Dual Hydraulic Brake Systems and Brake Booster Mechanism Therefor." The actuating means for the two pairs of cylinders extends along the projected central longitudinal axis, and passage means 20 and 21 are provided to hydraulically interconnect the two master cylinders of each pair so that upon a drop in pressure in one of the pairs of master cylinders, hydraulic and mechanical balance is maintained in the other pair. The first pair of master cylinders 15, 16 receive hydraulic fluid from reservoir 13 and control the pressure within the hydraulic line 11, while the second pair of master cylinders 17, 18 are associated with the other reservoir 14 so as to control the fluid pressure within the second hydraulic line 12.

Turning to the second pair of master cylinders 17, 18 for a more detailed description of the master cylinder construction, the top cylinder 17 receives hydraulic fluid from the reservoir 14 through a port 22 (FIG. 4) which is positioned to cooperate with a compensating check valve 23 having a rubber grommet 23a fastened to a stem 24. In order to hydraulically interconnect the two master cylinders 17, 18 the passage 21 is bored through the middle section of the casting 19 so as to communicate with the interiors of both master cylinders 17, and 18. As the pistons 17a, 18a are advanced within the master cylinders, hydraulic fluid received from the reservoir 14 is displace dfrom both master cylinders 17, 18 through a residual pressure check valve 25 in a discharge fitting boss 26 provided for the conventional fitting to the brake line 12.

It will be understood that the companion pair of master cylinders 15, 16 are similarly constructed and connected by passage 20 to displace hydraulic fluid from the reservoir 13 to the other brake line 11. As explained in the copending application Ser. No. 540,308 the interconnected master cylinders of each pair, such as the cylinders 17, 18 for example, are disposed symmetrically on opposite sides of the central longitudinal axis, which is the axis followed by the main actuating plunger to be described in more detail below. Consequently, if the hydraulic pressure drops in one pair of master cylinders, due to a failure in one of the hydraulic lines for example, the remaining pair of master cylinders is maintained in perfect hydraulic and mechanical balance because they operate independently of the other pair of master cylinders and are arranged symmetrically around the axis of the common actuator for all of the master cylinders. As a result, there are no undesirable off center or bending forces applied to the master cylinder assembly even in the event of a hydraulic failure in one of the dual brake lines except for the minimum effect of a very light spring (to be described below), and even this slight unbalance can be balanced out by use of a similar spring (not shown) in the second piston. In each terminal boss of the passages 20 and 21 there is provision for a stoplight switch 27 (FIG. 4) for use in connection with a system similar to that disclosed in my said U.S. Pat. No. 3,326,333.

Figure 7:
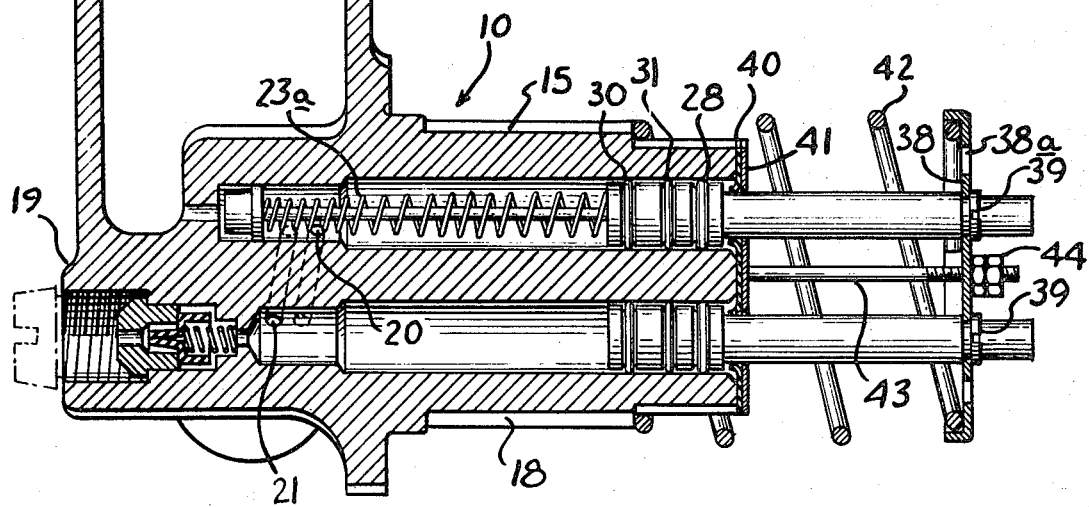
FIG. 7 is a section taken along line 7—7 in FIG. 6.

Referring to FIGS. 4, 5, and 7, the sealing arrangement provided for the master cylinder pistons is of the general type described in my U.S. Pat. 2,593,193 issued Apr. 15, 1952. Thus, each piston 15a through 18a is provided with three axially spaced grooves for receiving three identical sealing rings which provide a low pressure seal and a high pressure seal. Referring particularly to the master cylinder 17 shown in FIGS. 4 and 5, the low pressure seal is provided by a sealing ring 28 seated in a relatively shallow groove 29 in the piston 17a, while a dual high pressure seal is provided by a pair of sealing rings 30 and 31 seated in relatively deep grooves 32 and 33. The sealing rings 28, 30, and 31 are all preferably made of a deformable resilient material suitable for use with hydraulic brake fluid, and have an outside diameter about the same or slightly larger than that of the cylinder 17, so that the rings all fit snugly against the cylinder wall. The inside diameters of the three rings are all the same, and are such that the relatively shallow groove 29 slightly compresses the ring 28 to form a low pressure seal, while the relatively deep grooves 32, 33 form a narrow clearance around the inside of the rings 30, 31, respectively, to form a dual high pressure seal.

In the "off" position shown in FIG. 5, the piston 17a is subjected to relatively low static fluid pressures in the master cylinder 17, and the relatively deep grooves 32 and 33 are open beneath the sealing rings 30 and 31, while the relatively shallow groove 29 is closed by the compression of the ring 29 between the floor of the groove 29 and the wall of the cylinder 17. When the fluid pressure is increased by movement of the piston 17a, however, the sealing rings 30 and 31 pressed against the side wall of the grooves 32, 33 to increase the area of contact peripherally and laterally, and to close off the passageways through the grooves 32, 33. The low pressure sealing ring 28 is not substantially changed by the increased fluid pressure so the resulting friction of the piston seal 28 is not materially increased. When the high fluid pressure is released, the sealing rings 30 and 31 resume their normal positions, opening the grooves 32, 33 beneath the rings so as to prevent the trapping of high pressure fluid between the sealing rings. This sealing arrangement permits the use of a lighter return spring with the piston 17a. For a more detailed understanding of this general type of sealing arrangement, reference may be had to my aforementioned U.S. Pat. 2,593,193.

As the piston 17a is advanced within the master cylinder 17, a lost motion connection between the check valve stem 24 and the piston 17 causes the piston to telescope over the stem, thereby compressing a tapered coil spring 24a which biases the check valve 23 toward its closed position. More particularly, the valve stem 24 has a head 34 slidably received in an axial hole bored into the forward end of the piston 17a and piston rod 17b. The stop position of the stem head 34 is determined by a stop ring 35 recessed in the forward end of the piston and held in place by a snap ring 36 in a groove 37 (FIG. 5).

For the purpose of coupling all the master cylinder pistons to each other, as well as to the actuating means, all four piston rods 15b–18b project rearwardly from the casting 19 and are secured to a coupling plate 38. The plate 38 is fitted over reduced end portions on the four piston rods 15b–18b and held in place thereon by a plurality of snap rings 39, with the holes formed in the plate 38 being sufficiently loose around the rods 15b–18b to avoid binding. Consequently, the four master cylinder pistons are integrally connected so that they are always advanced and retracted in unison.

Figure 2:
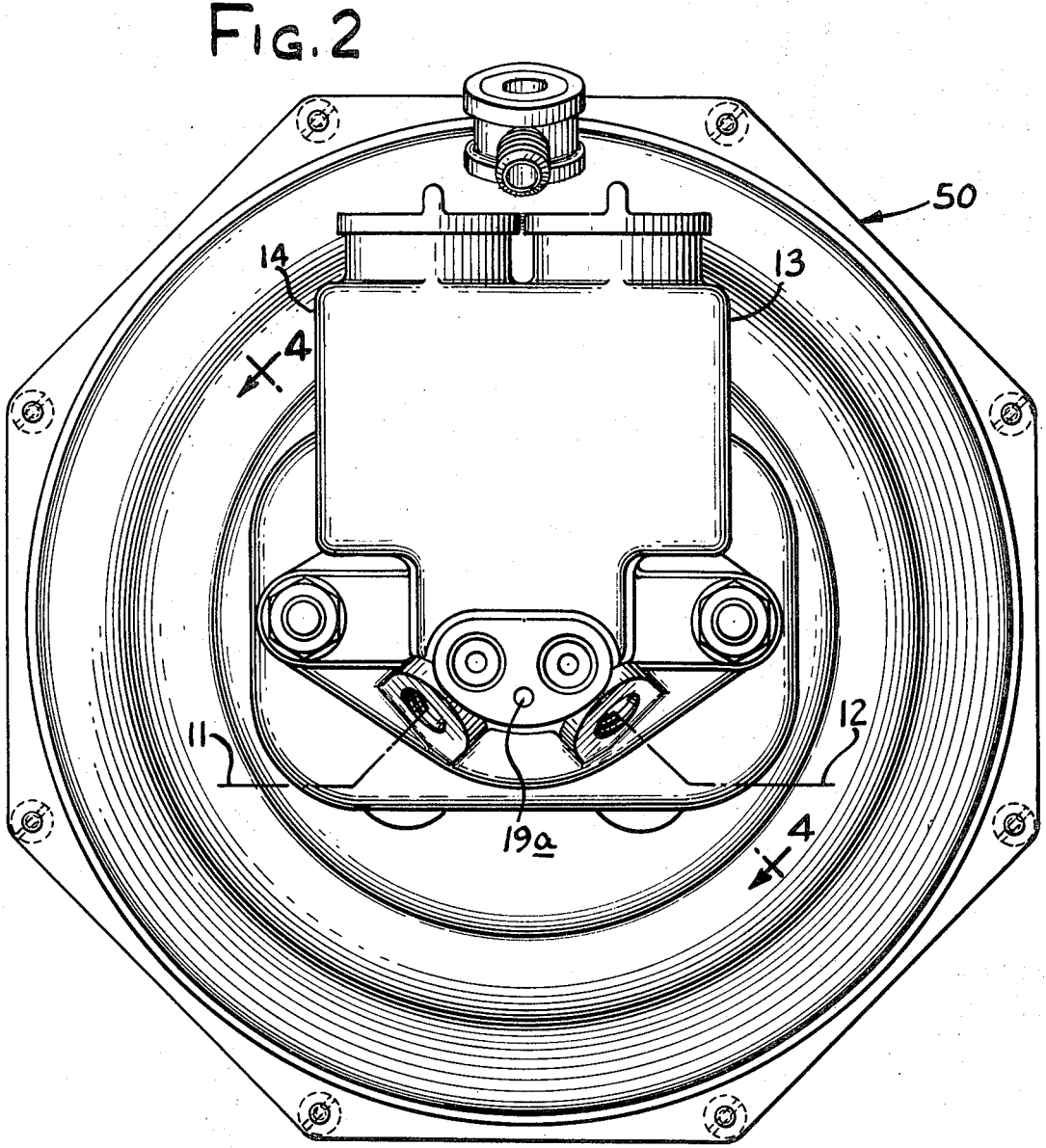
FIG. 2 is an end elevation taken from the left end of the mechanism shown in FIG. 1.
Figure 6:
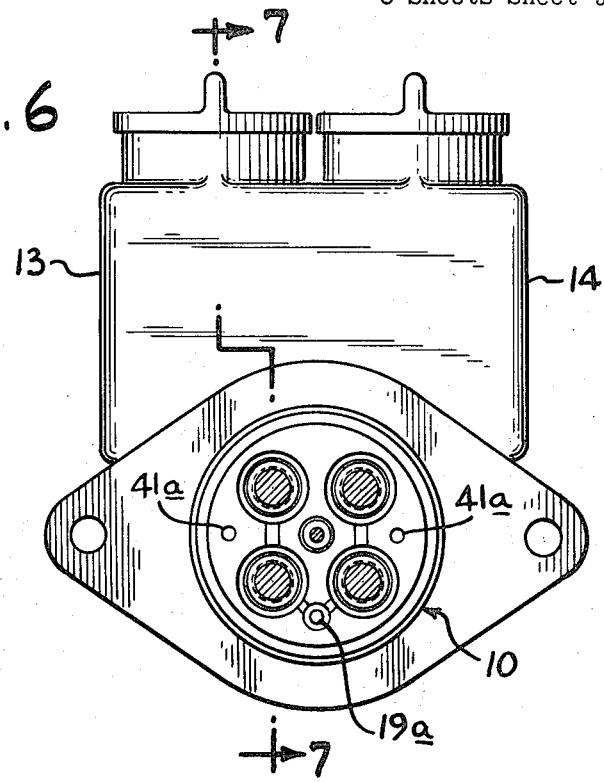
FIG. 6 is a vertical section taken along line 6—6 in FIG. 9.

In order to seal off any fluid leakage at the rear end of the master cylinder casting 19, a rubber sealing member 40 is fitted over the four piston rods 15b–18b and held against the rear end of the casting 19 by means of a retainer plate 41 having screws at 41a (FIGS. 1 and 6). Any fluid which manages to leak through one or more of the master cylinders can find access to the outside of the casting 19 through a hole 19a drilled axially therethrough (FIGS. 2, 6, and 8).

The return of retracting movement of the master cylinder pistons is effected by a return spring 24 fitted over a reduced rear portion of the casting 19, with the rear of the spring bearing against the coupling plate 38. This spring 42 is, of course, compressed during advancing movement of the master cylinder pistons, and then expands to retract the pistons, and also the power wall and actuating means, when the brake actuator is released. To limit the return movement, a limiting rod 43 is secured to the coupling plate 38 by a nut 44, and projects rearwardly therefrom for lost motion connection to the master cylinder casting 19. More particularly, the limiting rod 43 projects through the retainer plate 41 and terminates in a head 45 slidably received in a hole 46 bored along the central longitudinal axis of the casting 19. As the master cylinder pistons are retracted by the biasing action of the return spring 42, the head 45 abuts the sealing member 40 on the forward face of the retainer plate 41, thereby limiting the return movement at a fixed fully retracted position.

Turning now to the mechanism for actuating the master cylinder assembly, manual operation of a conventional brake pedal controls the axial movement of an elongated actuating rod 47 which, in turn, controls a power booster unit. The power booster unit more particularly includes a two-section main casing 50 provided with a movable power wall 51 operating axially movable actuating means herein shown as including a tubular output assembly 52 mounted in a guide sleeve 53 fixed to the front end of the casing along the center axis of the unit. A cooperating movable guide sleeve 54, which is the outermost member of the output assembly 52, projects forwardly in sliding engagement with the inner surface of a bearing sleeve 55, suitably made of low friction plastic having a separate, or as shown integral, air vacuum seal 56. The seal 56 is secured to the sleeve 53 by means of a series of integral bent tabs 57, so that the sleeve 53 supports and guides the power wall assembly independently of the pistons 15 through 18 so as to avoid binding them.

Movement of the output assembly 52 is controlled by the movable power wall 51 operable by differential pressure applied on opposite sides of the wall to produce power assist for operating the master cylinders. As herein shown, the casing 50 is connected to a source of vacuum such as the intake manifold of a vehicle engine via a conventional check valve 60. In the illustrative embodiment, the movable wall 51 is vacuum suspended, that is, in the retracted position of the wall 51 as shown in FIG. 1 the casing 50 is evacuated on both sides of the wall. By valve means 61 actuated by the control rod 47, air is admitted into the casing 50 behind the power wall 51 to provide the differential pressure for producing the output force operating the master cylinders. The valve means 61 is of the self-lapping type characterized by successive movements of the wall 51 and the valve means 61, which in the present case is carried by the wall 51, caused by successive movements of the control rod 47. This valve means is similar to the valve means described in my Pat. No. 2,794,320, except that the external spring and retainers shown in the patent are replaced by a stiffening device 62 and an internal spring 63 for more compactness and uniformity in determining the effective areas of the valve.

The power wall assembly 51 includes a pair of dished annular plate members 70, 71 designed to form an intermediate air chamber 72 therebetween. To support the plate members 70, 71 the outer ends thereof are secured to the beaded inner periphery of a flexible annular diaphragm 73 by means of five screws 74 fitted through the rear plate 71 into cooperating sleeves 75 mounted on the front plate 70 so as to draw the two plates firmly together. The beaded outer periphery of the diaphragm 73 is firmly anchored between the two sections of the main casing 50 so as to permit movement of the entire power wall assembly relative to the casing while maintaining a fluid seal between the wall and the casing.

It will be recognized that the power wall 51 divides the interior of the casing 50 into two separate chambers, namely, a forward "vacuum" chamber 80 and rear "power" chamber 81, and movement of the power wall is controlled by modulating the differential pressure between these two chambers. In the particular embodiment illustrated, the differential pressure is controlled by modulating the pressure within the power chamber 81 by means of the valve mechanism 61 which admits regulated amounts of air from the intermediate or delivery chamber 72 into the rear chamber 81. This pressure-modulating air is drawn into the brake mechanism through an opening 83 formed between the front wall of the casing 50 and the mounting cup 84 secured thereto. The incoming air passes through an annular filter or air cleaner 85 fitted between the front wall of the casing 50 and the front of the cup 84, for the purpose of excluding foreign matter from the interior of the brake mechanism. From the air filter 85, the air passes on through a plurality of registering ports 86 formed in the protruding forward portion of the casing 50 and the overlapping portion of the fixed guide sleeve 53. The air then flows rearwardly in a generally axial direction through the annular space between the fixed guide sleeve 53 and the master cylinder assembly, on into the cooperating movable guide sleeve 54, and finally through apertures 38a in the coupling plate 38 into the delivery chamber 72 formed between the two plates of the power wall. Thus, it will be appreciated that the intermediate delivery chamber 72 is at substantially atmospheric pressure at all times and the interconnecting passageways leading therefrom to the intake opening 83 are never closed. The seal 56 between the fixed and movable guide sleeves 53, 54 seals off atmosphere from the chamber 80 at all times.

As mentioned previously, movement of the power wall 15 is effected by admitting air into the power chamber 81 via the valve 61. Inasmuch as a vacuum exists at all times in the forward chamber 80, the force tending to advance the power wall 51 (i.e., movement to the left in FIG. 1) depends on the pressure in the chamber 81. This pressure is modulated by operation of the control valve 61, which is shown in FIG. 1 in its normal "off" or inoperative position.

Turning now to a more detailed description of the control valve 61, the particular embodiment illustrated utilizes a grommet valve which consists of a tubular bellows-like member 90, made of rubber or similar flexible material, normally disposed with its ends abutting the interior surfaces of the opposed power wall plates 70, 71. The walls of the valve member 90 are corrugated as in a bellows so as to permit longitudinal contraction and elongation thereof for the purpose of seating and unseating certain valve surfaces to be described in more detail below.

Normally, when the brake is not actuated by the vehicle operator, the valve 61 is open between the two chambers 80, 81 so that both chambers are under vacuum, and is closed between each of the two chambers 80, 81 and the intermediate air delivery chamber 72 so that no air is admitted to either of the two chambers 61, 62. In this stage, the grommet valve member 90 is held in its most elongated condition by means of the compression spring 63 (having a force only slightly more than necessary to expand the valve 90) seated within the member 90 against a pair of shallow terminal shoulders formed on the inner surface of the member 90. (As mentioned previously, a stiffening device in the form of a metal annulus 62 is also included in the valve, being fitted within a groove adjacent the shoulder at one end of the valve member 90.) Thus, the valve member 90 is normally held with its ends in tight sealing engagement with the inner surfaces of the plates 70, 71 which define the delivery chamber 73, with the spring 63 supporting the interior of the grommet to prevent it from collapsing, thereby preventing the passage of air out of the chamber 72 by isolating the same from the two chambers 80, 81.

In order to intercommunicate the two chambers 80, 81 the left end of the valve member 90 opens into the chamber 80 through a plurality of perforations 91 formed in a cup-shaped section 92 of the forward power wall plate 70, while the right end of the valve member 90 cooperates with an orifice 93 formed in the rear power wall plate 71. Thus, it can be seen that the two fluid chambers 80, 81 are in communication with each other through the interconnecting passage way formed by the perforations 91, the interior of the valve member 90, and the orifice 93.

For the purpose of isolating the two chambers 80, 81 from each other and at the same time admitting air from the delivery chamber 72 into the power chamber 81, a movable valve seat assembly is provided for closing the right end of the grommet valve member 90 and at the same time contracting the grommet valve 90 so as to unseat it from the rear power wall 71, thereby admitting air from the delivery chamber 72 into the power chamber 81. Thus, axially mounted within the cup-shaped section 92 and spaced from the interior wall of the valve member 90 is a movable valve seat assembly comprising a slidable plunger 94 having an inverted, hat-shaped valve seat 95 secured to the right hand end thereof. A compression spring 96 of predetermined force normally urges the plunger 94 and the valve seat 95 to the right so as to space the valve seat 95 slightly away from the member 90, thereby opening the orifice 93 to the power chamber 81. The plunger 94 is slidably carried in a bushing 97 which is spun into the left hand power wall plate 70, and is limited in its movement by a snap ring 98 which thus determines the off position of the valve.

When the plunger 94 is moved to the left with respect to the power wall 51 (as by control means hereinafter described), the movable seat 95 is brought to rest against the end of the grommet valve member 90, thus blocking any further communication between the chambers 80, 81. At this point, both chambers 80, 81 are isolated from the delivery chamber 72, and the valve is said to be in "lapped" position. Continued leftward movement of the valve seat 95 contracts the flexible valve member 90, thus lifting its right hand flange from contact with the plate 71 and permitting air within the intermedaite chamber 72 to flow through the annular orifice 93 into the power chamber 81. This produces a differential pressure between the chambers 80, 81 tending to move the power wall 51 to the left. Such leftward movement of the power wall is self-terminating because the entire valve assembly 61 moves away from the control means, permitting the valve member 90 to elongate again and reseat the right hand flange thereof against the plate 71, thereby terminating the flow of air into the power chamber 81.

In the particular mechanism illustrated, the main axially movable actuating means extends along a central longitudinal axis through the casing and the power wall, the valve mechanism for controlling the pressure differential across the wall is mounted on the power wall at a position offset from the actuating means, and the operation of the valve is controlled by a lever having one end pivoted on the power wall on the opposite side of the actuating means from the offset valve so that axial movement of the actuating means tilts the lever to operate the valve. Thus, in the illustrative embodiment axially moveable actuating means, to be described in more detail below, extends along a central longitudinal axis through the casing and the power wall, and the valve assembly 61 is mounted on the power wall at a position offset from the axis of the control rod 47 about midway between the central axis and the outside wall of the casing at a point where the valve assembly 61 safely clears the bearing sleeve 55 as the power wall is advanced (see broken line view in FIG. 1). This particular construction and the resultant advantages thereof are described in more detail in my copending application Ser. No. 540,308.

In order to operate the valve assembly 61 in response to incremental advancing movements of the control rod 47, a valve operating lever 100 is mounted within the power chamber 81 with its lower end pivoted on the power wall at a point 101 located on the opposite side of the control rod 47 from the valve assembly 61. The lever 100 extends upwardly from the pivot 101 with the lever having a cupped opening to fit over the control rod 47 and associated elements and being connected thereto by means of a pair of connecting or actuating pins 102 which fit into an adjustable mounting sleeve 104 included in the actuating mechanism. Consequently, any incremental advancing movement of the control rod 47 causes the pins 102 to tilt the upper portion of the lever 100 forward about its pivot point 101 so that the upper end of the lever engages the valve seat 95 and urges it forwardly, against the bias of the compression spring 96, into engagement with the grommet valve member 90. As described above, this point represents the "lapped" position of the valve.

Further advancing movement of the control rod 47 then tilts the lever 100 still further so as to advance the valve seat 95 to contract the grommet valve member 90 and unseat the right flange thereof from the power wall plate 71. This represents the power position in which air is admitted from the delivery chamber 72 into the power chamber 81. As the power wall 51 advances due to the pressure differential caused by the air admitted into the power chamber 81, the entire valve assembly 61 moves forward relative to the control rod 47 so that the valve elements are permitted to return to the lapped position due to the biasing action of the springs 63 and 96. Further advancing movement of the control rod 47 will then again tilt the lever 100 forwardly against the valve seat 95 and once again move the valve mechanism to the power position in which air is admited into the power chamber 72. This cyclic operation of the self-lapping valve 61 continues as long as the advance of the control rod 47 is continued by the vehicle operator. In order to carry the free end of the valve-operating lever 100 forward with the power wall, a stud 103 mounted on the power wall projects through the lever to receive a snap ring 104 bearing against the rear side of the lever, thereby providing a positive limit on the distance between the power wall and the lever and indexing the lever relative to the valve 61. It should be understood that although the lever 100 is carried forward with the power wall, the valve mechanism is still permitted to return to the lapped position because the lever advances relative to the control rod 47 and thus moves ahead of the lever-actuating pins 102.

It will be appreciated that the force exerted by the control rod 47 must be sufficient to overcome the compressive force of the valve spring 96 to reach the lapped position, and thereafter must overcome the effective forces of the two springs 96 and 63 in order to open the valve to the power position to admit air into the power chamber 81. Initially, there is no effective pressure differential acting on either of the springs 96 or 63 because the same vacuum is acting on both sides of the valve seat 95. However, as air is admitted into the power chamber 81 the modulated pressure therein gradually increases while a vacuum is still maintained within the valve assembly on the inside of the valve seat 95. Consequently, the pressure differential which moves the power wall acts on the effective diameter I of the valve seat 95 and thus also assists the control rod 47 and the lever 100 in overcoming the resistive forces of the springs 96 and 63. Hence, in the absence of a compensating device, it would gradually become easier and easier to operate the control valve 61.

Accordingly, a compensating means is operatively connected to the brake actuating means for responding to the modulated pressure in the power chamber for varying the force required to advance the actuating means as a function of the modulated pressure so as to compensate for the effect of the modulated pressure on the force required to operate the valve mechanism. Thus, a boot 110 is fitted over a portion of the control rod 47 behind the rear wall of the casing 50. The outer periphery of the boot 110 is beaded as at 111 for connection to a complementally formed flange 112 formed on the edge of the casing opening surrounding the control rod 47. It can be seen that the inside surface of the boot 110 is exposed to the modulated pressure within the power chamber 81, while the outside surface of the boot 110 is exposed to the atmosphere thereby providing a pressure differential across the boot corresponding to the ratio of the outside atmospheric pressure to the modulated pressure within the power chamber 81. It can also be seen that in order to advance the control rod 47, it is necessary to gradually collapse the boot inwardly toward the casing flange 112, and the resistive force thus offered by the boot 110 depends on the pressure differential across the boot and its effective diameter II. Of course, this pressure differential is a maximum, in a vacuum suspended unit like that shown, with the power wall at the right hand end of the casing when vacuum prevails in the power chamber, and decreases as the modulated pressure increases within the power chamber. The differential pressure on the boot thus varies inversely with the pressure differential across the valve seat 95, which also depends on the modulated pressure in the power chamber. In other words, as the modulated pressure gradually increases and thus makes it easier to operate the valve 61, it also decreases the assistance given to the control rod 47 by the flexible boot 110. Accordingly, the boot 110 is sized so as to effectively compensate for the effect of the modulated pressure on the force required to operate the valve mechanism.

The valve operating lever 100 is a first-class lever having a ratio determined by its over all length and the length of the arm between the actuating pins 102 and the lever pivot point 101. For example, the ratio between these two lengths may suitably be on the order of about 4 to 1. This ratio in effect multiplies the effective force of the valve springs 63 and 96 and requires a relatively larger force, in the absence of compensation, to operate the valve 61 via the control lever 100. However, since the lever is pivoted at its lower end and thus operates as a first-class lever, any actuating motion is amplified in transmission to the valve assembly 61 so that the response of the valve follows very quickly the application of the manual force. Because the valve is compensated by the boot 110, at the start of operation of the unit with vacuum prevailing in the power chamber, this vacuum acts on the effective diameter II of the boot (with air outside the boot) tending to force the control rod 47 into the unit and thus assisting its motion. This compensating force acts in opposition to the valve springs 63 and 96 which are selected to provide a slightly greater force so that there remains a small force differential to be overcome at the beginning condition, to operate the valves and thus produce power from the suit. Since any change in modulated pressure in the power chamber as it affects the operation of the valve mechanism is balanced out due to the boot, the force differential which must be overcome to operate the valve mechanism remains the same throughout the entire range of operation of the power unit as the pressure in the power chamber increases from vacuum to atmospheric at run-out.

In order to maintain a substantially constant ratio between the force which must be applied to the control rod 47 to operate the valve 61 and the force required to operate the valve, the effective areas of the valve 61 and the boot 110 which are exposed to the modulated pressure must have substantially the same ratio to each other as the ratio of the two lever arms from the pivot point 101. For example, if the lever arms have a ratio of about 4 to 1, then the effective area of the boot 110 which is exposed to the modulated pressure must be substantially four times as great as the effective area of the valve seat 95 which is exposed to the same modulated pressure. Thus, if the boot effective area is made larger, this ratio of the lever arms can be made greater to satisfy the desired compensation characteristic.

Figure 3:
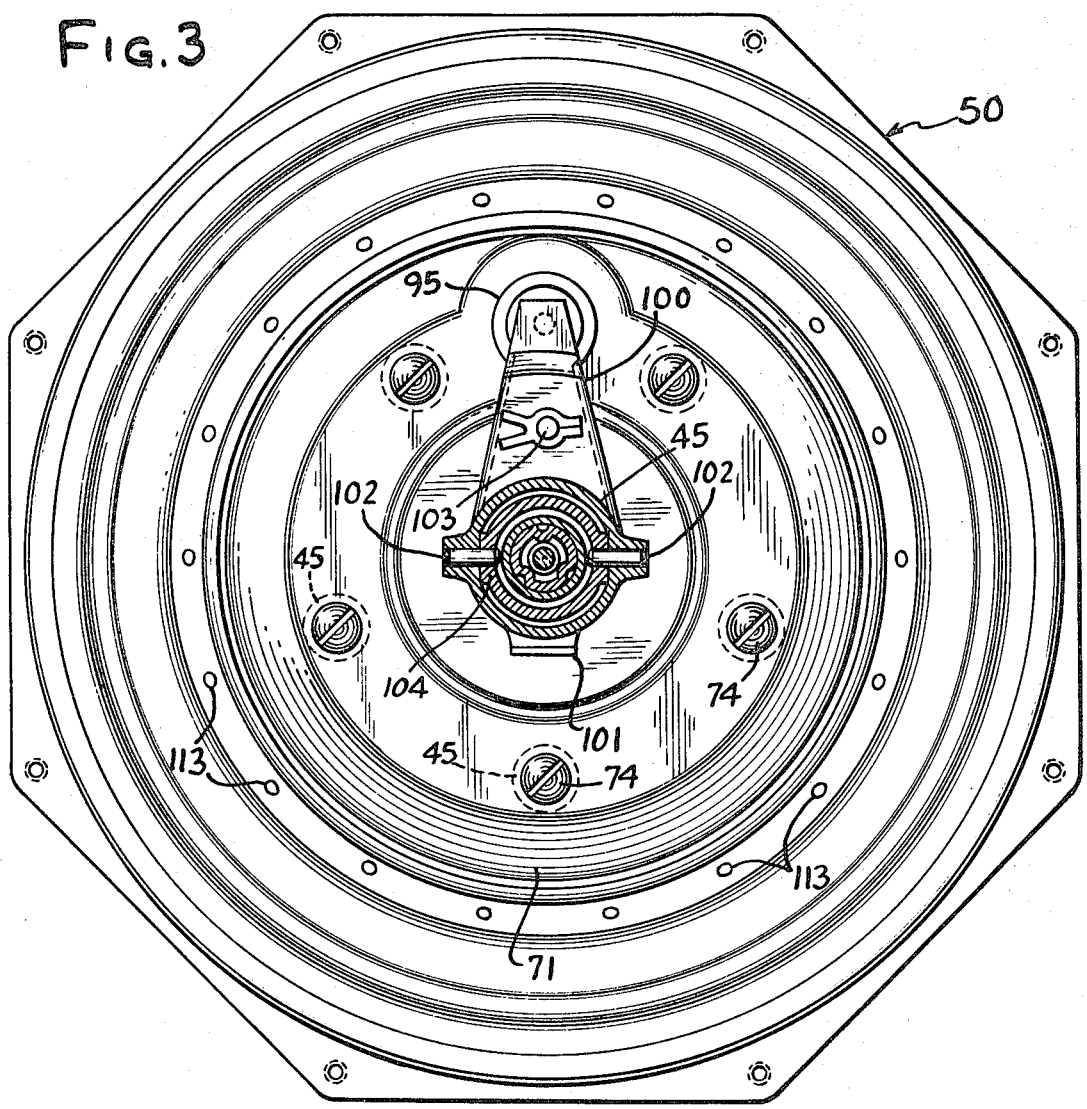
FIG. 3 is a vertical section taken along line 3—3 in FIG. 1 with the forward casing section removed.

In accordance with one aspect of the present invention, the power wall is provided with a relief valve means which is normally closed during normal movement of the power wall, and which opens in response to advancing movement of a rigid portion of the power wall ahead of the flexible diaphragm so as to provide an open fluid passage through the wall for relieving excessive pressure on the vacuum side of the wall. This feature is especially useful where the power wall is suddenly advanced before all the air passed through the valve assembly 61 has been evacuated from the vacuum chamber and, therefore, might resist advancing movement of the wall. Thus, in the illustrative embodiment, a plurality of relief ports are provided in a portion of the power wall diaphragm which overlaps the forward power wall plate so that a supplemental means of communication is provided between the vacuum chamber and the power chamber in response to a "panic stop." Referring particularly to FIGS. 1 and 3, a plurality of relief ports 113 are formed in that portion of the diaphragm 73 which overlaps the rear side of the forward plate 70. During normal operation of the power wall 51, the relief ports 113 are closed because the diaphragm 73 is continuously held snugly against the plate 70 due to the higher pressure in the power chamber 81 and the form of the rubber, relative to the vacuum chamber 80 on the forward side of the diaphragm. In the case of a "panic stop," however, the sudden forward movement of the manually operated rod 47 causes the forward plate 70 to move ahead of the overlapping portion of the diaphragm 73, thereby opening the ports 113 to relieve the excessive pressure. This permits a smaller restriction to be used in the check valve 60, which connects the vacuum chamber 80 to the engine manifold, because it is no longer necessary for the valve 60 to perform a relief function. Consequently, the tendency which a larger opening in the check valve 60 might have to stall the engine is avoided.

In order to provide a realistic "feel" to the foot pedal or other actuating device for the booster unit, a reaction mechanism is included in the illustrative structure to transmit a gradually increasing proportion of the total reaction force from the output assembly 52 to the actuating rod 47 for the unit, this actuating rod being adapted to be connected to the foot pedal or some other operating element. More particularly, the reaction mechanism is such that the power booster unit provides an initially high boost ratio which gradually decreases in the reaction changeover region to a lower boost ratio which is maintained over the remaining range of operation of the power booster unit to run-out of the vacuum.

In accordance with one aspect of the present invention, the reaction mechanism is mounted within the fluid chamber between the power wall plates to provide a compact assembly that permits the master cylinder assembly to be buried deeply within the casing forming the chambers on opposite sides of the power wall. Thus, in the particular embodiment illustrated, a relatively large resilient bumper element 120, suitably made of rubber or a rubber substitute such as neoprene, is bonded to the inside of the rear power wall plate 71 for cooperation with a reaction plunger 121. The reaction plunger 121, is slidably received in a rearwardly projecting sleeve 122 formed as an integral part of the rear power wall plate 71. There is a stop gap 104a between the snap ring 104 and sleeve 122 to avoid overstressing the rubber element 120 in a panic stop or at power run-out.

As the plunger 121 is advanced by manual advance of the rod 47, the leading face 123 of the plunger engages the resilient bumper 120 so that a portion of the reaction force transmited back through the bumper element is applied via the plunger 121 to the manual control rod 47 and thence to the foot pedal. This reaction force is applied to the resilient bumper 120 by the master cylinder assembly via an output plate 124 bonded to the front side of the bumper. It can be seen that the resilient bumper 120 is the sole coupling means between the manual actuator 47 and the power wall 51 on the input side, and the master cylinder assembly on the output side. Consequently, the bumper 120 transmits not only the actuating forces, but also the reaction forces.

The resilient bumper 120 is initially effective only against the leading face 123 of the plunger 121, plus the face 125 of a surrounding metal annulus 126 which transmits reaction force to the power wall 51 via a rubber ring 126a. This provides an initially light reaction force opposing pedal action and a high boost ratio determined by the rate of the return spring 24, and relatively low reaction from the resilient bumper 120 because the plunger flange 127 is designed to clear the rubber ring 126a in the lapped position of the valve assembly 61. As the power wall advances upon successive increments of forward movement of the actuating rod 47, the reaction mechanism transmits a progressively greater portion of the total reaction force from the master cylinder plungers to the actuating rod 47 and thence to the foot pedal, the remaining portion being applied to the power wall 51. Thus, upon successive increments of movement of the power wall and increase in reaction force, the flange 127 on the plunger 121 comes into engagement with the annulus 126 so that a portion of the total reaction force transmitted through the annulus 126 is applied to the actuating rod 47 (less the limited initial reaction force via the rubber ring 126a). Thus, the reaction plunger 121 encounters increased resistance to forward movement because the lapped position of the plunger 121 is fixed relative to the valve assembly 61, the result being to transmit a gradually increasing proportion of the total reaction force to the actuating rod and thus to the pedal. The resilient rubber bumper 120 is adapted to have predetermined hardness and deflection characteristics to change the proportion of reaction force applied to the pedal at least during initial increments of movement thereof.

Whenever the manual actuating force is removed from the control rod 47, both the central actuating means and the power wall assembly are returned to their normally retracted position by means of the return spring 42 acting between the output member 38 and the master cylinder casting 19, and also by the light return springs associated with the upper master cylinders of the two hydraulically connected pairs of master cylinders. As the power wall is returned to its retracted position, the biasing spring 96 unseats the valve member 95 from the end of the grommet valve member 90 so as to re-establish intercommunication between the two chambers 80 and 81. As a result, the air which was admitted into the power chamber 81 during operation of the brake is exhausted into the forward chamber 80 and then on out through the valve 60 to the intake manifold or other vacuum source. If the chamber 80 is made several times the volume of the chamber 81, and the other forces are properly balanced, a substantial number of successive operations of the power unit are possible without exhausting the vacuum power in the reservoir provided by the chamber 80.

In assembling the power unit provided by this invention, the entire power wall assembly including the plates 70 and 71, the valve assembly 61, the diaphragm 73, and the guide sleeve 54 are all preassembled and may be tested as a separate unit. Such tests may be made for example by introducing air under pressure into the sleeve 54 and submerging the entire assembly in water whereby any leaks will be indicated by bubbles. This subassembly is then mounted on the forward section of the casing, including the master cylinders and associated elements carried thereby after which the lever 100 and the associated mounting sleeve 104 are mounted on the back of the power wall. To complete the assembly, the reaction plunger 121 is threaded into the sleeve 104, the rear casing section is fastened to the front section, and the boot 110 and control rod 47 are added. In other words, the threaded plunger 121 and the rear casing section lock the entire internal assembly firmly in place.

Moreover, the threaded connection between the sleeve 104 and the reaction plunger 121 facilitates fine adjustments in the lap gap, i.e., the gap between the leading face of the plunger 121 and the resilient bumper 120 when the control valve 61 is in its lapped position. This fine adjustment feature is especially important in a device which includes an amplifying lever mechanism for actuating the control valve, as in the illustrative device; and where the input reaction force acts through a restricted range of motion so as to limit any undesirable loss of pedal stroke in the operation of the unit. Also, it is apparent that the adjustment can be made easily even when the unit is assembled on a vehicle, merely by unfastening the boot 110 at 112 where the adjustment will be exposed for any correction required in service.

I claim as my invention:

1. In a power unit for a hydraulic brake system, the combination of a casing having a power wall assembly which is responsive to differential pressures across the wall, said power wall asembly including an annular diaphragm secured to said casing around the outer periphery of said diaphrgam and a pair of opposed pressure plates secured to the inner periphery of said diaphragm, said plates being axially spaced apart from each other to form a fluid chamber therebetween, axially movable actuating means for controlling said master cylinder assembly via said power wall, and reaction mechanism mounted within said fluid chamber between the power wall plates to provide a compact assembly, said reaction mechanism being operatively associated with said actuating means for providing a reaction force opposing increments of movement of said actuating means, a master cylinder assembly mounted on the forward wall of said casing and extending rearwardly into said casing for operative association with said reaction mechanism, said reaction mechanism including a resilient bumper element bonded to one of said power wall plates on one side and an output member bonded to the other side of said bumper element for operating said master cylinder upon advancing movement of said power wall.

2. A power unit for a hydraulic brake system as defined in claim 1 which includes a multiple master cylinder assembly mounted on the forward wall of said casing and extending rearwardly into said casing for operative association with said reaction mechanism.

3. A power unit for a hydraulic brake system as defined in claim 1 in which said reaction mechanism includes a resilient bumper element mounted on and carried by said power wall.

4. A power unit for a hydraulic brake system as defined in claim 1 in which a valve assembly for controlling the movement of said power wall is also mounted within said fluid chamber between the power wall plates.

5. In a power unit for a hydraulic brake system, the combination of a casing having a power wall assembly which is responsive to differential pressures across the wall, said power wall assembly including a pair of opposed plates axially spaced from each other to form a fluid chamber therebetween, a master cylinder assembly and manually operated actuating means for controlling said master cylinder assembly via said power wall, reaction transmitting means operatively associated with said actuating means for providing a reaction force opposing increments of movement of said actuating means, said reaction transmitting means including a resilient bumper element mounted within said fluid chamber between said power wall plates to provide a compact assembly and being at least partially unconfined, output means operatively connected to said resilient bumper element for operating said master cylinder assembly upon advancing movement of said power wall, and plunger means operatively connected to said actuating means and adapted to engage said resilient bumper element upon manual advance of said actuating means whereby said resilient element is deformed into the free space adjacent the unconfined areas thereof.

6. A power unit for a hydraulic brake system as set forth in claim 5 wherein said resilient bumper and plunger means being adapted to change the proportion of reaction force applied to the pedal at least during initial increments of movement thereof.

References Cited

UNITED STATES PATENTS

| | | | |
|---|---|---|---|
| 2,842,101 | 7/1958 | Price | 91—422 XR |
| 2,993,478 | 7/1961 | Cripe | 60—54.6 XR |
| 2,997,027 | 8/1961 | Ingres | 60—54.6 XR |
| 3,012,544 | 12/1961 | Pulkownik | 60—54.6 XR |
| 3,016,880 | 1/1962 | Kellogg et al. | 60—54.6 XR |
| 3,035,551 | 5/1962 | Rike | 60—54.6 XR |
| 3,082,744 | 3/1963 | Gardner | 60—54.6 XR |
| 3,102,453 | 9/1963 | Brooks et al. | 60—54.6 XR |
| 3,172,334 | 3/1965 | Wuellner et al. | 60—54.6 XR |
| 3,212,408 | 10/1965 | Randol | 60—54.6 XR |
| 3,246,578 | 4/1966 | Randol | 91—376 XR |
| 3,358,449 | 12/1967 | Brown | 60—54.6 |
| 3,390,616 | 7/1968 | Hammer | 91—422 |
| 3,422,622 | 1/1969 | Arentoft et al. | 60—54.6 XR |

MARTIN P. SCHWADRON, Primary Examiner

R. BUNEVICH, Assistant Examiner

U.S. Cl. X.R.

60—54.6; 91—369